(12) United States Patent
Kauffmann

(10) Patent No.: US 10,928,410 B2
(45) Date of Patent: Feb. 23, 2021

(54) LIQUID TEST SAMPLE INJECTION DEVICE AND KITS AND METHODS OF USE RELATED THERETO

(71) Applicant: Siemens Healthcare Diagnostics Inc., Tarrytown, NY (US)

(72) Inventor: Aaron Kauffmann, Elkhart, IN (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 229 days.

(21) Appl. No.: 15/970,272

(22) Filed: May 3, 2018

(65) Prior Publication Data

US 2018/0321271 A1 Nov. 8, 2018

Related U.S. Application Data

(60) Provisional application No. 62/501,303, filed on May 4, 2017.

(51) Int. Cl.
*G01N 35/10* (2006.01)
*B01L 3/02* (2006.01)
*G01N 35/00* (2006.01)

(52) U.S. Cl.
CPC .......... *G01N 35/1016* (2013.01); *B01L 3/022* (2013.01); *G01N 35/10* (2013.01); *G01N 35/1002* (2013.01); *B01L 2200/026* (2013.01); *B01L 2200/0689* (2013.01); *B01L 2300/048* (2013.01); *B01L 2300/0832* (2013.01); *B01L 2300/0838* (2013.01); *B01L 2400/0478* (2013.01); *G01N 35/00584* (2013.01)

(58) Field of Classification Search
CPC ............... G01N 35/1016; G01N 35/10; G01N 35/1002; G01N 35/00584; B01L 3/022; B01L 2200/026; B01L 2200/0689; B01L 2300/048; B01L 2300/0832; B01L 2300/0838; B01L 2400/0478
USPC ....................................................... 422/521
See application file for complete search history.

(56) References Cited

U.S. PATENT DOCUMENTS

| | | | | |
|---|---|---|---|---|
| 2005/0106750 A1* | 5/2005 | Tung | .................... | A61B 10/007 436/169 |
| 2011/0104747 A1* | 5/2011 | Pollack | ................. | B01F 13/002 435/40.5 |
| 2013/0006146 A1* | 1/2013 | Vemalarajah | ........ | A61B 10/007 600/573 |
| 2014/0050620 A1* | 2/2014 | Johnson | ........... | A61B 5/150755 422/68.1 |
| 2016/0081732 A1* | 3/2016 | Baroud | .............. | A61B 17/8811 623/23.62 |

\* cited by examiner

*Primary Examiner* — Benjamin R Whatley
*Assistant Examiner* — Jacqueline Brazin
(74) *Attorney, Agent, or Firm* — Dunlap Codding P.C.

(57) ABSTRACT

Devices, kits, and methods related to embodiments of an improved liquid test sample injection device for use in diagnostic assays.

20 Claims, 11 Drawing Sheets

LIQUID TEST SAMPLE INJECTION DEVICE AND KITS AND METHODS OF USE RELATED THERETO

CROSS REFERENCE TO RELATED APPLICATIONS

The subject application claims benefit under 35 USC § 119(e) of U.S. provisional Application No. 62/501,303, filed May 4, 2017. The entire contents of the above-referenced patent application are hereby expressly incorporated herein by reference.

STATEMENT REGARDING FEDERALLY FUNDED RESEARCH OR DEVELOPMENT

Not Applicable.

TECHNICAL FIELD

The presently disclosed and claimed inventive concept(s) relate to a device(s), kit(s), and method(s) for dispensing at least one liquid test sample for use in analyte(s) detection assays. More specifically, the presently disclosed and claimed inventive concept(s) relate to an improved device for injecting at least one liquid test sample within a reaction vessel for use in analyte(s) detection assays, as well as kits and methods of use related thereto.

BACKGROUND

Numerous devices, kits, and methods exist for injecting liquid test samples within a reaction vessel for conducting assays that detect analytes that may be present in the liquid test samples. Such devices have been proven to be effective in diagnostic assays that detect the presence and quantity of certain analytes indicative of a patient's health, including, but not limited to, glycated hemoglobin (HbA1c), microalbumin and creatinine, and lipid-based analytes, such as cholesterol, triglycerides, and/or high-density lipoproteins. However, these devices, kits, and methods are limited in that it is difficult and/or time consuming to diffuse the liquid test sample into the reaction vessel for conducting the particular assay, and, in some cases, the full volume of the liquid test sample is not diffused into the reaction vessel. In addition, for some liquid test samples, the longer the liquid test sample stays in the injection device, the more difficult it is to remove or diffuse the liquid test sample from the injection device. Such devices, kits, and methods, therefore, result in an increase in the amount of time it takes to conduct a particular assay and limits the length of time a liquid test sample can be contained within the injection device prior to injection into the reaction vessel. Accordingly, a need exists for new and improved devices, kits, and methods that allow for the timely, controlled injection of a liquid test sample into a reaction vessel for conducting a diagnostic assay. Such improved devices, kits, and methods thereby allow, by way of example and not by way of limitation, for: (1) increased assay efficiencies via a decrease in the amount of time necessary to inject a liquid test sample into a reaction vessel resulting from the active of injection of the liquid test sample into the reaction vessel; and (2) an increase in the amount of time that a liquid test sample can remain in the liquid test sample injection device before having to be injected into a reaction vessel—the "hold time" of the liquid test sample is increased. It is to such devices, kits, and methods that the presently disclosed and claimed inventive concept(s) is directed.

DETAILED DESCRIPTION

Figure 1:
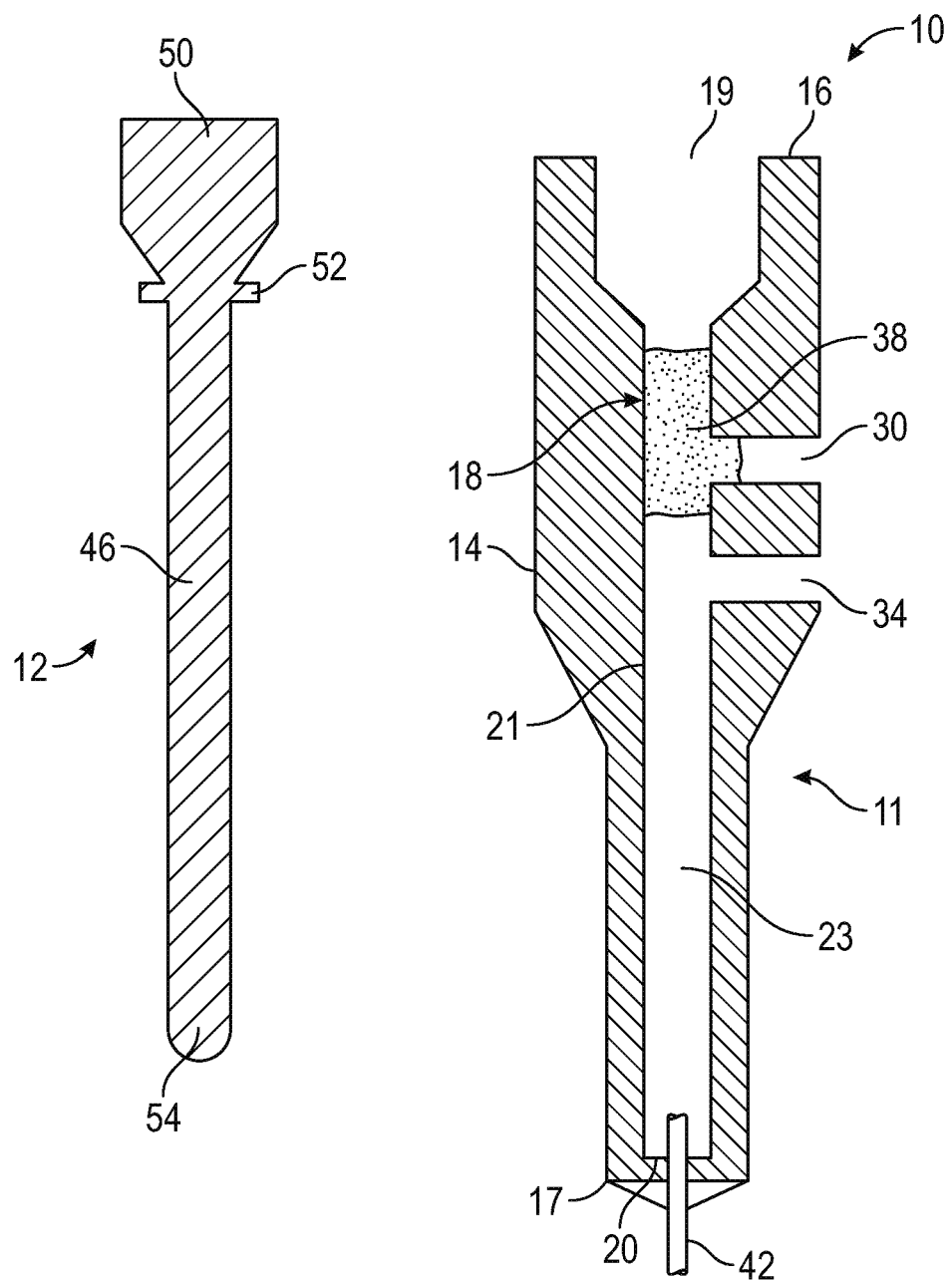
FIG. 1 is cross-sectional view of one non-limiting embodiment of the improved liquid test sample injection device constructed in accordance with the presently disclosed and/or claimed inventive concept(s).

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined herein, scientific and technical terms used in connection with the presently disclosed and claimed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art.

All patents, published patent applications, and non-patent publications mentioned in the specification are indicative of the level of skill of those skilled in the art to which this presently disclosed and claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the devices, kits, and/or methods disclosed and claimed herein can be made and executed without undue experimentation in light of the present disclosure. While the compositions and methods of this presently disclosed and claimed inventive concept(s) have been described in terms of preferred embodiments, it will be apparent to those of skill in the art that variations may be applied to the compositions and/or methods and in the steps or in the sequence of steps of the method described herein without departing from the concept, spirit and scope of the presently disclosed and claimed inventive concept(s). All such similar substitutes and modifications apparent to those skilled in the art are deemed to be within the spirit, scope and concept of the inventive concept(s) as defined by the appended claims.

As utilized in accordance with the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The singular forms "a," "an," and "the" include plural referents unless the context clearly indicates otherwise. Thus, for example, reference to "a compound" may refer to 1 or more, 2 or more, 3 or more, 4 or more or greater numbers of compounds. The term "plurality" refers to "two or more." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example but not by way of limitation, when the term "about" is utilized, the designated value may vary by ±20% or ±10%, or ±5%, or ±1%, or ±0.1% from the specified value, as such variations are appropriate to perform the disclosed methods and as understood by persons having ordinary skill in the art. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used in this specification and claim(s), the terms "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein, the phrase "associated with" includes both direct association of two moieties to one another as well as indirect association of two moieties to one another. Non-limiting examples of associations include covalent binding of one moiety to another moiety either by a direct bond or through a spacer group, non-covalent binding of one moiety to another moiety either directly or by means of specific binding pair members bound to the moieties, incorporation of one moiety into another moiety such as by dissolving one moiety in another moiety or by synthesis, and coating one moiety on another moiety.

The term "liquid test sample" as used herein will be understood to include any type of biological fluid sample that may be utilized in accordance with the presently disclosed and claimed inventive concept(s). Examples of biological samples that may be utilized include, but are not limited to, whole blood or any portion thereof (i.e., plasma or serum), saliva, sputum, cerebrospinal fluid (CSF), intestinal fluid, intraperotineal fluid, cystic fluid, sweat, interstitial fluid, tears, mucus, urine, bladder wash, semen, combinations, and the like. The volume of the sample utilized in accordance with the presently disclosed and claimed inventive concept(s) is from about 0.1 to about 100 microliters. As used herein, the term "volume" as it relates to the liquid test sample utilized in accordance with the presently disclosed and claimed inventive concept(s) means from about 0.1 microliter to about 100 microliters, or from about 1 microliter to about 75 microliters, or from about 2 microliters to about 60 microliters, or less than or equal to about 50 microliters, or less than or equal to about 40 microliters. In one non-limiting embodiment of the presently disclosed and/or claimed inventive concept(s), the liquid test sample is either whole blood and/or urine.

The term "patient" includes human and veterinary subjects. In certain embodiments, a patient is a mammal. In certain other embodiments, the patient is a human. "Mammal" for purposes of treatment refers to any animal classified as a mammal, including human, domestic and farm animals, nonhuman primates, and zoo, sports, or pet animals, such as dogs, horses, cats, cows, etc.

The term "reaction vessel" includes any device(s) capable of performing at least one diagnostic assay as described herein. The reaction vessel may perform the diagnostic assay(s) manually, but, in most instances, the reaction vessel will be inserted into a system that automates the performance of the diagnostic assay(s). In one non-limiting embodiment, the reaction vessel comprises a reaction cassette for use in automated diagnostic assays conducted by the DCA Vantage® Analyzer commercially available from Siemens Healthcare Diagnostics, Inc.

Turning now to particular embodiments, the presently disclosed and claimed inventive concept(s) relate to a device(s), kit(s), and method(s) for injecting a patient's liquid test sample into a reaction vessel. More specifically, the presently disclosed and claimed inventive concept(s) relate to an improved liquid test sample injection device that comprises a plug that forms an airtight seal that facilitates the active injection of a liquid test sample into a reaction vessel, and kits and methods of use related thereto.

It is contemplated that virtually any reagent used in the fields of biological, chemical, or biochemical analyses and assays could be used in the devices, kits, and methods of the presently claimed and disclosed inventive concept(s). It is contemplated that these reagents may undergo physical and/or chemical changes when bound to an analyte of interest whereby the intensity, nature, frequency, or type of signal generated by the reagent-analyte complex is directly proportional or inversely proportional to the concentration of the analyte existing within the fluid sample. These reagents may contain indicator dyes, metal, enzymes, polymers, antibodies, and electrochemically reactive ingredients and/or chemicals that, when reacting with an analyte(s) of interest, may exhibit change in color.

Any method of detecting and measuring the analyte in a fluid sample can be used in the devices, kits, and methods of the presently claimed and inventive concepts. A variety of assays for detecting analytes are well known in the art and include, but are not limited to, chemical assays, enzyme inhibition assays, antibody stains, latex agglutination, latex agglutination inhibition and immunoassays, such as, radio-immunoassays. The term "antibody" herein is used in the broadest sense and refers to, for example, intact monoclonal antibodies, polyclonal antibodies, multi-specific antibodies (e.g., bispecific antibodies), and to antibody fragments that exhibit the desired biological activity (e.g., antigen/analyte-binding). The antibody can be of any type or class (e.g., IgG, IgE, IgM, IgD, and IgA) or sub-class (e.g., IgG1, IgG2, IgG3, IgG4, IgA1, and IgA2).

While immunoassays (including, but not limited to, sequential analytical chemical and immunoassays) are primarily discussed herein for the detection of at least one analyte of interest present in a liquid test sample, a person having ordinary skill in the art should readily understand that the presently disclosed and claimed inventive concept(s) are not strictly limited to immunoassays and may include, by way of example and not by limitation, chemical and chemical-based assays, nucleic acid assays, lipid-based assays, and serology-based assays. Immunoassays, including radio-immunoassays and enzyme-linked immunoassays, are useful methods for use with the presently claimed and disclosed inventive concepts. A variety of immunoassay formats, including, for example, competitive and non-competitive immunoassay formats, antigen/analyte capture assays and two-antibody sandwich assays can be used in the methods of the invention. Enzyme-linked immunosorbent assays (ELISAs) can be used in the presently claimed and disclosed inventive concepts, as well. In the case of an enzyme immunoassay, an enzyme is typically conjugated to a second antibody, generally by means of glutaraldehyde, periodate, hetero-bifunctional crosslinking agents, or biotin-streptavidin complexes. As will be readily recognized, however, a wide variety of different conjugation techniques exist which are readily available for use with the presently disclosed and claimed inventive concept(s) to one skilled in the art.

Assays, including, but not limited to, immunoassays, nucleic acid capture assays, lipid-based assays, and serology-based assays, can be developed for a multiplexed panel of proteins, peptides, and nucleic acids which may be contained within a liquid test sample, with such proteins and peptides including, for example but not by way of limitation, albumin, microalbumin, cholesterol, triglycerides, high-density lipoproteins, low-density lipoproteins, hemoglobin, myoglobin, α-1-microglobin, immunoglobins, enzymes, proteins, glycoproteins, protease inhibitors, drugs, cytokines, creatinine, and glucose. The device(s), kit(s), and method(s) disclosed and/or claimed herein may be used for the analysis of any liquid test sample, including, without limitation, whole blood, plasma, serum, or urine.

Referring now to the Figures, and more particularly to FIG. 1, shown therein is a non-limiting embodiment of a liquid test sample injection device 10 that dispenses at least one liquid test sample into a reaction vessel. The liquid test sample injection device 10 comprises an injection body 11, a plunger 12, and a capillary 42.

In one non-limiting embodiment, and as shown in FIG. 1, the injection body 11 comprises at least one side 14, a first end 16, a second end 17, and a plunger receptacle 18. The plunger receptacle 18 comprises a receptacle wall (not numbered) having a first end 19, a second end 20, at least one side 21, and a bore 23 extending longitudinally from the first end 19 to the second end 20 of the receptacle wall of the plunger receptacle 18, such that the bore 23 is substantially parallel to and contained between the at least one side 14 of the injection body 11. The bore 23 can be configured to be any shape, including, without limitation, circular, ovular, triangular, square, rectangular, trapezoidal, pentagonal, hexagonal, heptagonal, octagonal, nonagonal, decagonal, or polygonal. In one non-limiting embodiment, the bore 23 is ovular. The plunger receptacle 18 is configured to receive the plunger 12 (shown in greater detail in FIG. 2) through an opening (not numbered) located at the first end 19 of the plunger receptacle 18. The plunger receptacle 18 further comprises at least one inlet 30 laterally extending between the at least one side 14 of the injection body 11 and the at least one side 21 of the plunger receptacle 18 such that the at least one inlet 30 forms an open channel between the at least one side 14 of the injection body 11 and at least one side 21 of the plunger receptacle 18. The at least one inlet 30 is configured to receive at least one plug 38 such that the at least one plug 38 resides in the bore 23 of the plunger receptacle 18 after insertion of the plug 38 through the at least one inlet 30. Additionally, as shown in FIG. 1, the plunger receptacle 18 further comprises at least one outlet 34 laterally extending between the at least one side 14 of the injection body 11 and the at least one side 21 of the receptacle wall of the plunger receptacle 18 such that the at least one outlet 34 forms an open channel between the at least one side 14 of the injection body 11 and the at least one side 21 of the plunger receptacle 18. The at least one outlet 34 is configured to dissipate and/or release ambient air (not shown) which may be present in the bore 23 when the plunger 12 is inserted in the plunger receptacle 18 of the injection body 11. In addition, when the injection body 11 is secured within a reaction vessel 62 (shown in greater detail in FIG. 2), the at least one inlet 30 and at least one outlet 34 are substantially flush with at least one internal wall (not numbered) of the reaction vessel 62. Upon insertion of the plunger 12 into the plunger receptacle 18 of the injection body 11, the downward motion of the plunger 12 results in the deformation of the at least one moldable plug 38 around the plunger 12 which causes: (1) the release of any ambient air that may be present within the bore 23 up through the plug 38 and out the at least one outlet 34; and (2) the formation of a substantially airtight seal between the at least one inlet 30 and at least one outlet 34 and the at least one internal wall of the reaction vessel 62 thereby effectively sealing the injection body 11 within the reaction vessel 62.

While FIG. 1 depicts a single inlet 30 and a single outlet 34 both extending laterally between the at least one side 14 of the injection body 11 and the at least one side 21 of the receptacle wall of the plunger receptacle 18 that are substantially rectangular in cross-sectional shape, it should be readily understood to a person having ordinary skill in the art that: (1) the plunger receptacle 18 may comprise any number of inlets and/or outlets (or no inlets and/or outlets at all) capable of accomplishing the presently disclosed and/or claimed inventive concept(s)—in an alternative, non-limiting embodiment, the plunger receptacle may comprise a single channel that simultaneously acts as both an inlet and an outlet that accomplished the objectives of the presently disclosed and/or claimed inventive concept(s); (2) the at least one inlet 30 and at least one outlet 34 can be any cross-sectional shape(s) capable of accomplishing the presently disclosed and/or claimed inventive concept(s), including, without limitation, ovular, triangular, or square—in addition, the at least one inlet 30 and the at least one outlet 34 may be same or different in shape; and (3) the at least one inlet 30 and the at least one outlet 34 can be located at any position(s) along the liquid test sample injection device 10, provided that a channel(s) is/are created from at least one side of the injection body 11 to the bore 23 of the plunger receptacle 18. The injection body is preferably fabricated as a molded component formed of a rigid plastic material (so as to avoid deformation of the injection body 11 when both collecting a patient's liquid test sample and/or inserting the injection body 11 into a reaction vessel), including, for example, high-density polyethylene; however, a person having ordinary skill in the art should appreciate that the injection body 11 may be constructed of any material capable of accomplishing the presently disclosed and/or claimed inventive concept(s). The description(s) contained in this paragraph with respect to the at least one inlet 30 and/or at least one outlet 34 herein pertain to all embodiments (when such embodiments comprise at least one inlet and/or at least one outlet) of the presently disclosed and/or claimed inventive concept(s).

As discussed hereinabove, in one non-limiting embodiment, the plug 38 is injected through the at least one inlet 30 such that the plug 38 is inserted and remains substantially in the bore 23 of the plunger receptacle 18 of the injection body 11. The injection of the plug 38 through the at least one inlet can be accomplished via any methodology commonly known in the art. Including, without limitation, either manually by a user or via an automated process during the manufacturing of the injection body 11. In one non-limiting embodiment, the plug 38 is injected via an automated process during the manufacturing of the injection body 11. The plug 38 is constructed of a moldable, permeable (or semi-permeable), non-reactive, chemically-inert, semi-solid composition that remains stationary and only minimally, if at all, deforms within the bore 23 of the plunger receptacle 18 when the plunger 12 is not inserted in the plunger receptacle 18 of the injection body 11. In one non-limiting embodiment, the plug 38 comprises a petroleum-based product, including, without limitation, a petroleum-based jelly. However, it should be understood by a person having ordinary skill in the art that the plug 38 may comprise any substance(s), compound(s), or material(s) that accomplish the objectives of the presently disclosed and/or claimed inventive concept(s). For instance, in an alternative, non-limiting embodiment, the plug 38 may comprise a porous or semi-porous, solid material, including, without limitation, starch. In one non-limiting embodiment, the plug 38 comprises starch and the plug is located within plunger receptacle 18 just below the at least one outlet 34, the plug 38, when comprised of starch, being solidified upon contact with the patient's liquid test sample. The plug 38, when comprised of starch, is particularly useful when the patient's liquid test sample is urine, but a person having ordinary skill in the art should readily appreciate that the currently disclosed and/or claimed inventive concept(s) are not limited to a plug 38 comprising starch when the patient's liquid test sample is urine.

Upon insertion of the plunger 12 into the plunger receptacle 18 of the injection body 11 (as more fully shown in FIG. 2), the plug 38 is compressed by the plunger 12 thereby forming a substantially air-tight seal between the plunger body 46 and the at least one side 21 of the receptacle wall of the plunger receptacle 18. The plug 38 also serves to lubricate the plunger receptacle 18 thereby facilitating the insertion movement of the plunger 12 into the plunger receptacle 18 of the injection body 11. In addition, and as described in greater detail with respect to FIG. 2, upon insertion of the plunger 12, the plug 38 forms a bolus at a distal end 54 of the plunger 12 that facilitates the injection (and prevents the backfilling) of a patient's liquid test sample 58 from capillary 42 into a reaction vessel 62. Additionally, when the injection body 11 is secured within a reaction vessel 62 (shown in greater detail in FIG. 2), the at least one inlet 30 and at least one outlet 34 are substantially flush with at least one internal wall (not numbered) of the reaction vessel 62. Upon insertion of the plunger 12 into the plunger receptacle 18 of the injection body 11, the downward motion of the plunger 12 results in the deformation of the at least one moldable plug 38 around the plunger 12 which causes the formation of a substantially airtight seal between the at least one inlet 30 and at least one outlet 34 and the at least one internal wall of the reaction vessel 62 thereby effectively sealing the injection body 11 within the reaction vessel 62. With respect to FIG. 2, the plug 38 remains in the bore 23 and does not contact the capillary 42 or the second end 20 of the injection body 11.

The plunger 12 comprises a plunger body 46 having a proximal handle end 50 and a distal end 54. In certain non-limiting embodiments, the proximal handle end 50 may comprise at least one flange 52 for selectively securing the plunger 12 within the plunger receptacle 18 when the plunger 12 is inserted into the plunger receptacle 18. The plunger is preferably constructed of a semi-rigid, inert, flexible material(s) that allow(s) for the plunger 12 to be easily inserted into the plunger receptacle 18 with minimal, if any, deformation and/or bending of the plunger 12 upon insertion of the plunger 12 into the plunger receptacle. Suitable materials for constructing the plunger 12, include, without limitation, synthetic and/or naturally-occurring or derived polymers (both organic and/or inorganic), such as, by way of example only, thermoplastic polymer(s), thermoset polymer(s), elastomer(s), and/or synthetic fiber(s) such as low-density polyethylene, high density polyethylene, polystyrene, polyvinylchloride, styrene butadiene, polyacrylics, polyvinyl acetate, and combinations thereof.

The capillary 42 is adapted to collect a patient's liquid test sample and to subsequently inject the liquid test sample into a reaction vessel. In one non-limiting embodiment, the capillary 42 collects the patient's liquid fluid sample via capillary action when the capillary 42 is in contact with the patient's liquid test sample. However, a person having ordinary skill in the art should readily appreciate that the liquid test sample can be collected by the capillary 42 via any method commonly known in the art, including, without limitation, via creation of a negative pressure differential that draws the patient's liquid test sample into the capillary 42. The capillary 42 can be constructed of any material(s) commonly known in the art, including, without limitation, glass and/or chemically-inert plastic(s). The size and volume-capacity of the capillary 42 will vary depending on the type and quantity of the patient's fluid sample being collected. In certain non-limiting embodiments, the capillary 42 may be adapted and sized to hold volumes of from about 0.1 microliter to about 100 microliters, or from about 0.5 microliters to about 95 microliters, or from about 1 microliter to about 90 microliters, or from about 2 microliters to about 85 microliters, or from about 5 microliters to about 80 microliters, or from about 10 microliters to about 75 microliters, or from about 15 microliters to about 70 microliters, or from about 20 microliters to about 65 microliters, or from about 25 microliters to about 60 microliters, or from about 30 microliters to about 55 microliters, or from about 35 to about 50 microliters, or less than or equal to about 40 microliters. By way of example only, and not by way of limitation, the volume capacity of the capillary 42 is about 1 microliter when the patient's liquid test sample is whole blood. In one non-limiting embodiment, the capillary 42 extends through the second end 17 of the injection body 11 and the second end 20 of the plunger receptacle 18 such that a portion of the capillary 42 is positioned and secured within the plunger receptacle 18, while at least one portion of the capillary remains external to the injection body 11 for collection of the patient's liquid test sample.

Figure 2:
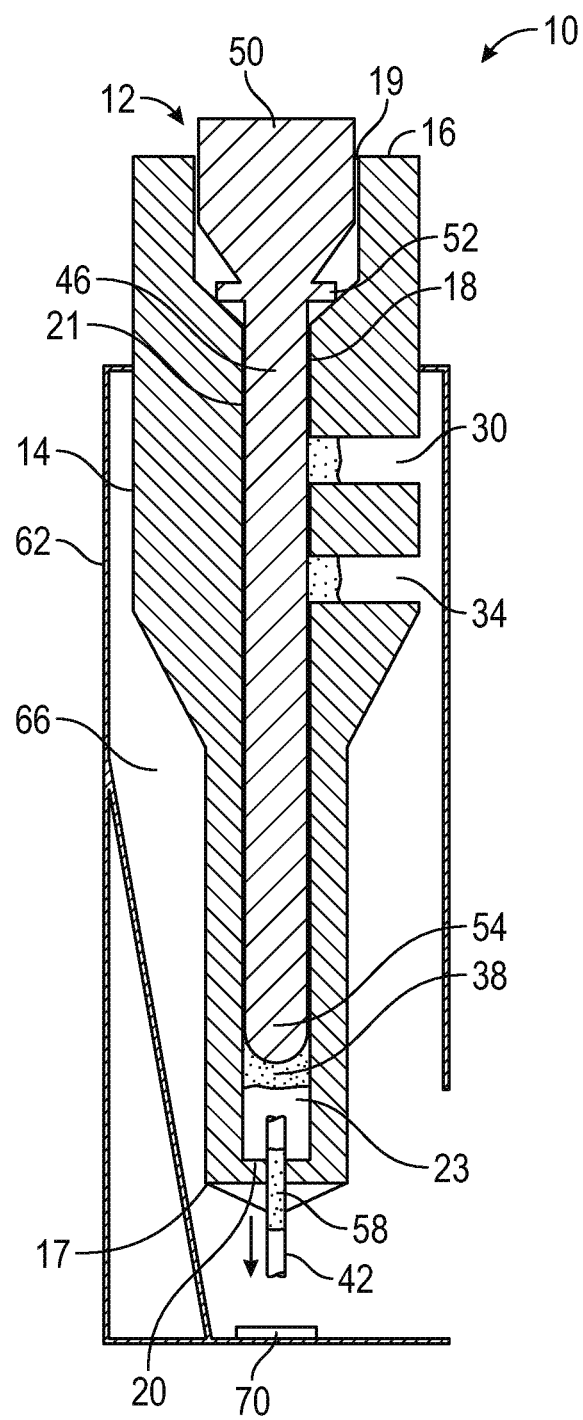
FIG. 2 is a cross-sectional view of the improved liquid test sample injection device of FIG. 1 in which the device is inserted into a reaction vessel.

Referring now to FIG. 2, shown therein is a cross-sectional view of the liquid test sample injection device 10 of FIG. 1 which has been secured within a reaction vessel 62 post collection of a patient's liquid test sample 58. While FIG. 2 depicts the plunger 12 having already been inserted into the plunger receptacle 18, it should be readily understood to a person having ordinary skill in the art that the depression of the plunger 12 occurs either manually or via automated procedure after the injection body 11 has been secured within the reaction vessel 62 to thereby accomplish the presently disclosed and/or claimed inventive concept(s). Upon insertion of the plunger 12 into the plunger receptacle 18 of the injection body 11 (which has already occurred in FIG. 2), the downward insertion of the plunger 12 deforms and/or compresses the plug 38 such that the plug 38 forms a substantially air-tight seal between the plunger body 46 and the at least one side 21 of the receptacle wall of the plunger receptacle 18. The downward motion of the sealed plunger 12 (through the plug 38) creates a force that both: (1) causes any ambient air that may have collected or be present in the plunger receptacle 18 to be expelled up through the plug 38 and out the at least one outlet 34; and (2) produces a pressure sufficient enough to actively and fully inject the liquid test sample 58 from capillary 42 into a reaction chamber 66 of the reaction vessel 62 onto at least one reagent pad 70 for the conductance of at least one diagnostic assay. In addition, when the injection body 11 is secured within a reaction vessel 62, the at least one inlet 30 and at least one outlet 34 are substantially flush with at least one internal wall (not numbered) of the reaction vessel 62. Upon insertion of the plunger 12 into the plunger receptacle 18 of the injection body 11, the downward motion of the plunger 12 results in the deformation of the at least one moldable plug 38 around the plunger 12 which causes the formation of a substantially airtight seal between the at least one inlet 30 and at least one outlet 34 and the at least one internal wall of the reaction vessel 62 thereby effectively sealing the injection body 11 within the reaction vessel 62.

Figure 3:
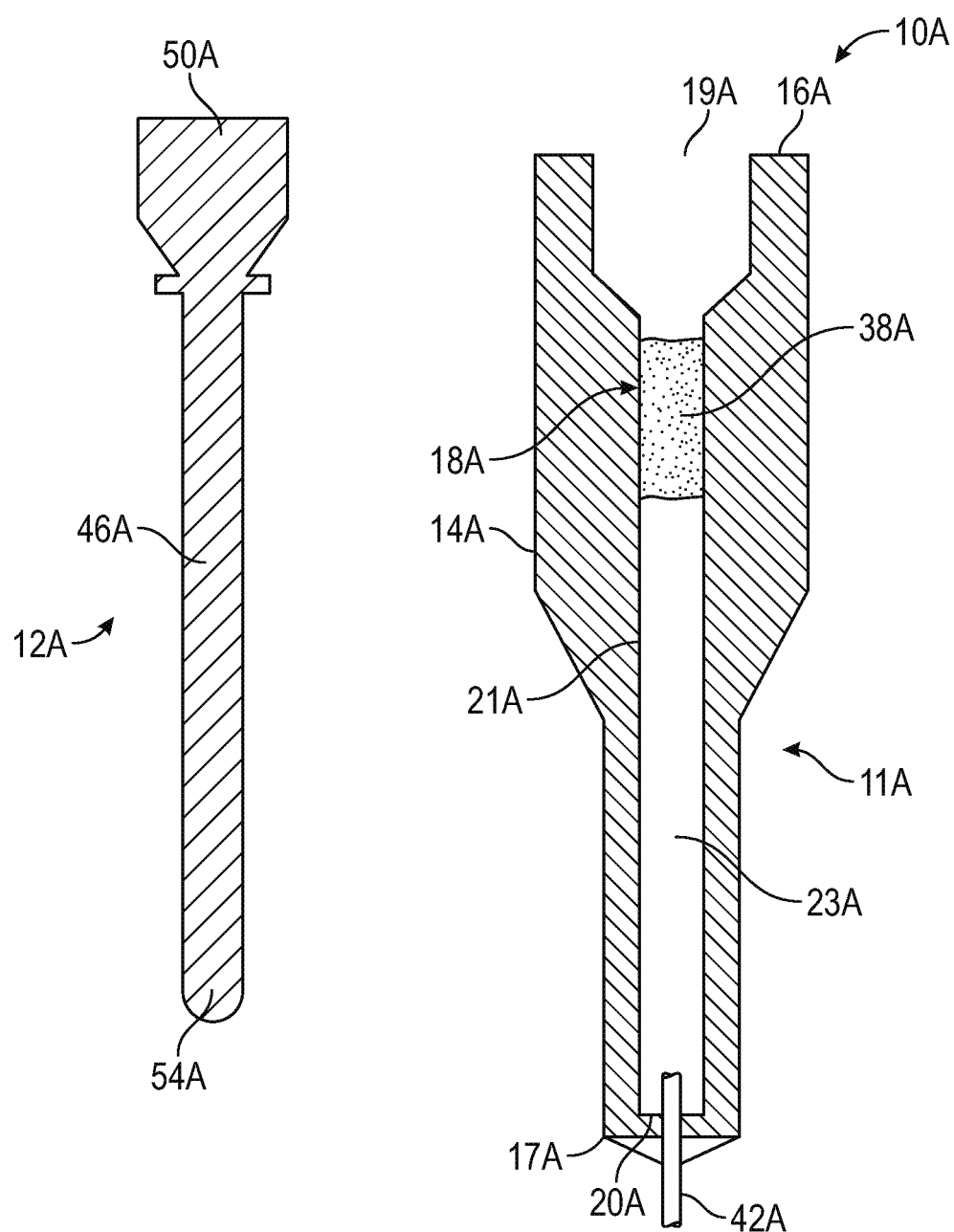
FIG. 3 is a cross-sectional view of an alternative non-limiting embodiment of the improved liquid test sample injection device constructed in accordance with the presently disclosed and/or claimed inventive concept(s).
Figure 4:
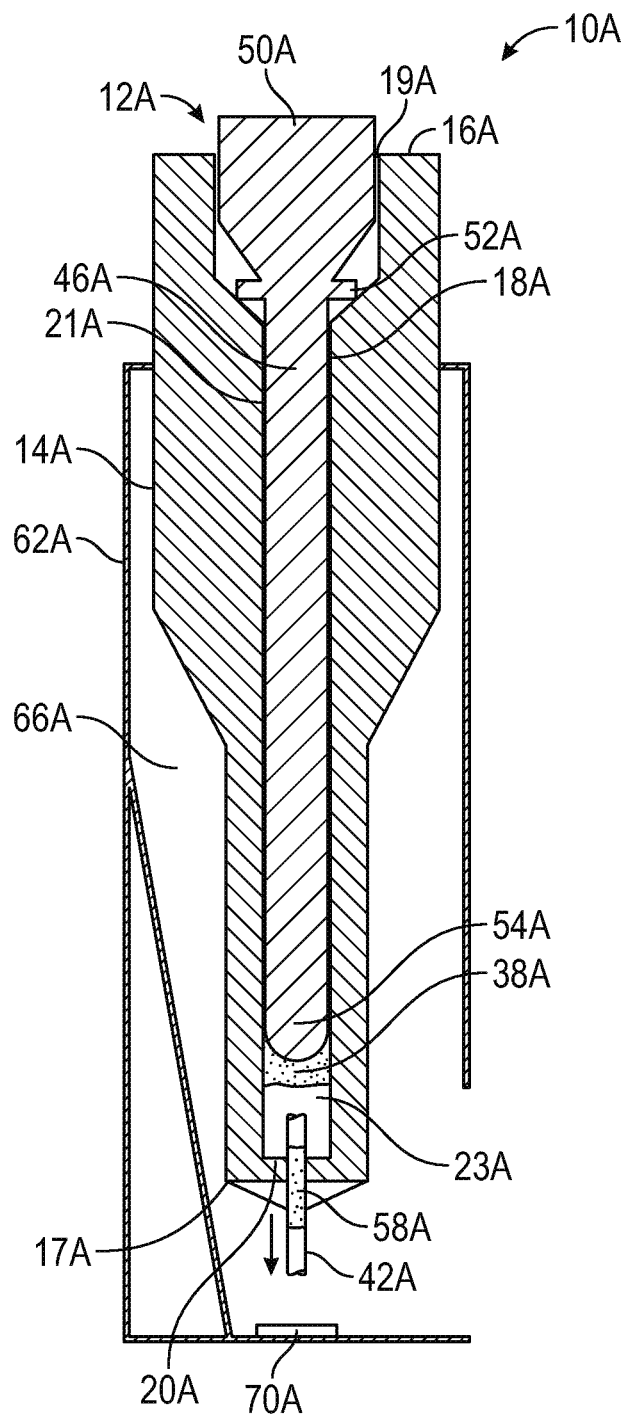
FIG. 4 is a cross-sectional view of the improved liquid test sample injection device of FIG. 3 in which the device is inserted into a reaction vessel.

Referring now to FIGS. 3-4, shown therein is an alternative non-limiting embodiment of a liquid test sample injection device 10A that dispenses at least one liquid test sample into a reaction vessel. The liquid test sample injection device 10A and reaction vessel 62A are structurally similar to the liquid test sample injection device 10 depicted in FIG. 1 and the reaction vessel 62 depicted in FIG. 2. Accordingly, for purposes of brevity and as a result of these structural and functional similarities, only the differences in the structure(s) (and function(s)), if any, of the liquid test sample injection device 10A and/or reaction vessel 62A will be discussed herein. The description of the liquid test sample injection device 10 and reaction vessel 62 with respect to FIGS. 1-2 is applicable to the liquid test sample injection device 10A and reaction vessel 62A, other than for the structural and functional difference(s) described hereinbelow with respect to the liquid test sample injection device 10A and the reaction vessel 62A.

As shown in FIG. 3, the liquid test sample injection device 10A does not comprise at least one inlet 30 and at least one outlet 34. Rather, the plug 38A is injected through an opening (not numbered) located at a first end 19A of a plunger receptacle 18A. Such injection of the plug 38A can be accomplished via any methodology commonly known in the art, including, but not limited to, either manually or via an automated process during the manufacturing process of the liquid test sample injection device 10A.

Referring now to FIG. 4, upon insertion of the plunger 12A into the plunger receptacle 18A of the injection body 11A (which has already occurred in FIG. 4), the downward insertion of the plunger 12A deforms and/or compresses the plug 38A such that the plug 38A forms a substantially air-tight seal between the plunger body 46A and at least one side 21A of the receptacle wall of the plunger receptacle 18A. The downward motion of the sealed plunger 12A (through the plug 38A) creates a force that both: (1) causes any ambient air that may have collected or be present in plunger receptacle 18A to be expelled up through the plug 38A and out the opening (not numbered) located at the first end 19A of the plunger receptacle 18A; and (2) produces a pressure sufficient enough to actively and fully inject the liquid test sample 58A from capillary 42A into a reaction chamber 66A of the reaction vessel 62A onto at least one reagent pad 70A for the conductance of at least one diagnostic assay.

Figure 5:
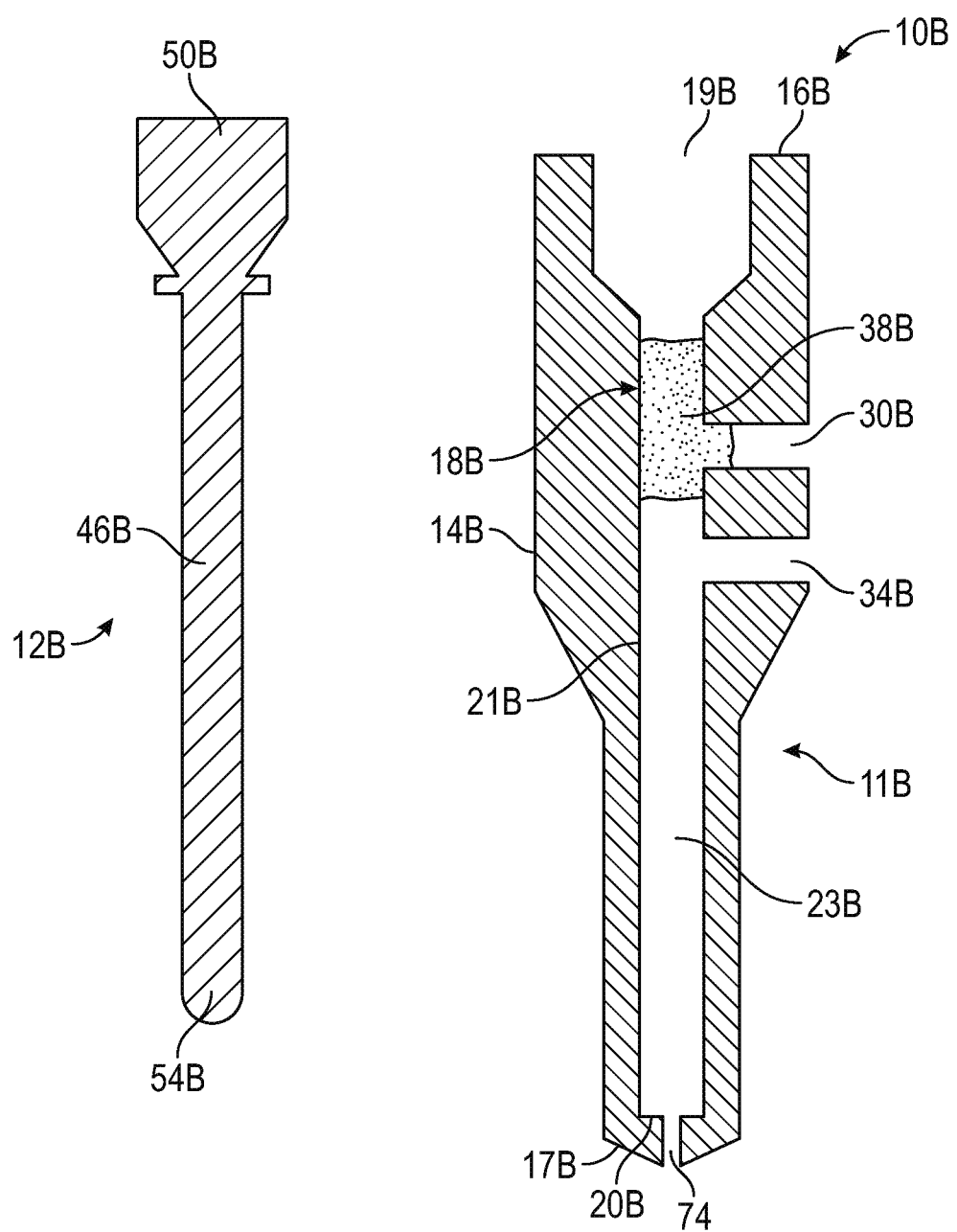
FIG. 5 is a cross-sectional view of an alternative non-limiting embodiment of the improved liquid test sample injection device constructed in accordance with the presently disclosed and/or claimed inventive concept(s).
Figure 6:
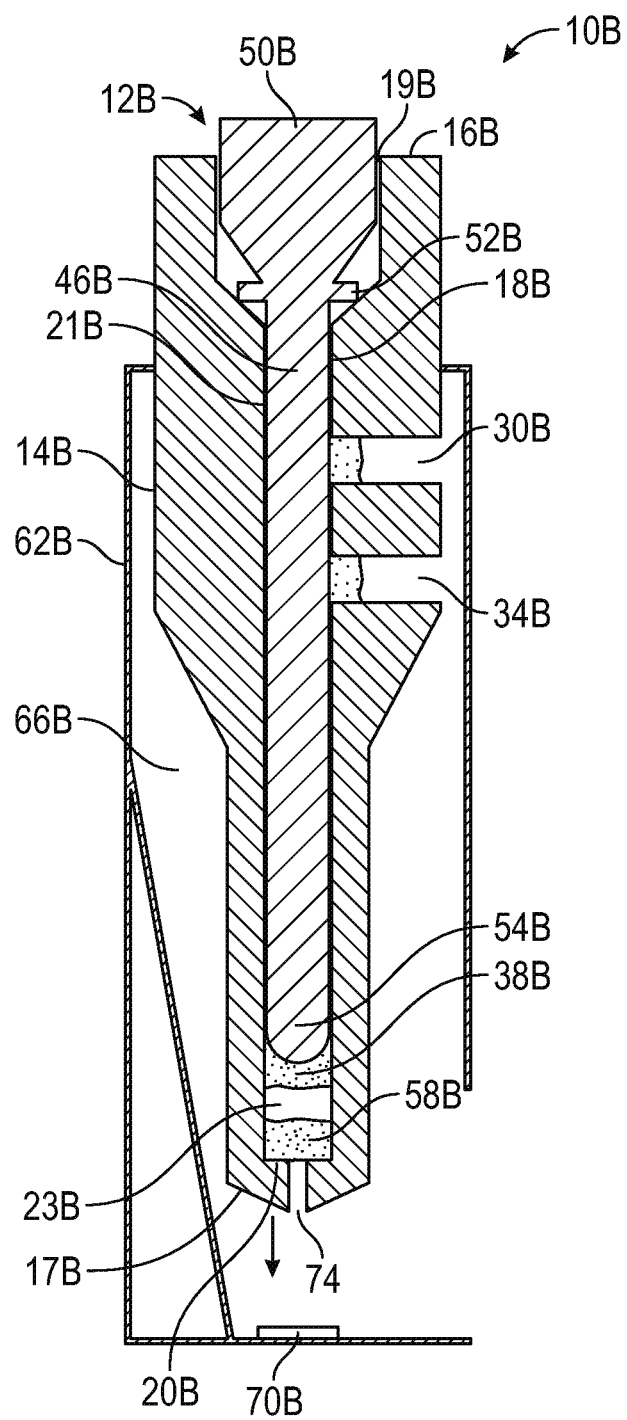
FIG. 6 is a cross-sectional view of the improved liquid test sample injection device of FIG. 5 in which the device is inserted into a reaction vessel.

Referring now to FIGS. 5-6, shown therein is an alternative non-limiting embodiment of a liquid test sample injection device 10B that dispenses at least one liquid test sample into a reaction vessel. The liquid test sample injection device 10B and reaction vessel 62B are structurally similar to the liquid test sample injection device 10 depicted in FIG. 1 and the reaction vessel 62 in FIG. 2. Accordingly, for purposes of brevity and as a result of these structural and functional similarities, only the differences in structure(s) (and function (s)), if any, of the liquid test sample injection device 10B and/or reaction vessel 62B will be discussed herein. The description of the liquid test sample injection device 10 and reaction vessel 62 with respect to FIGS. 1-2 is applicable to the liquid test sample injection device 10B and reaction vessel 62B, other than for the structural and/or functional difference(s) described hereinbelow with respect to the liquid test sample injection device 10B and the reaction vessel 62B.

As shown in FIG. 5, the liquid test sample injection device 10B does not comprise a capillary 42; rather, the liquid test sample (shown more specifically in FIG. 6) is drawn into the plunger receptacle 18B of the injection body 11B via capillary action through opening 74. The internal diameter of the plunger receptacle 18B (and/or opening 74) is of such a dimension that the patient's liquid test sample does not leak or exit from the plunger receptacle 18A once collected.

Referring now to FIG. 6, upon insertion of the plunger 12B into the plunger receptacle 18B of the injection body 11B (which has already occurred in FIG. 6), the downward insertion of the plunger 12B deforms and/or compresses the plug 38B such that the plug 38B forms a substantially air-tight seal between the plunger body 46B and a first side 21B and second side 22B of the receptacle wall of the plunger receptacle 18B. The downward motion of the sealed plunger 12B (through the plug 38B) creates a force that both: (1) causes any ambient air that may have collected or be present in plunger receptacle 18B to be expelled up through the plug 38B and out the at least one outlet 34B; and (2) produces a pressure sufficient enough to actively and fully inject the liquid test sample 58B through opening 74 into a reaction chamber 66B of the reaction vessel 62B onto at least one reagent pad 70B for the conductance of at least one diagnostic assay.

Figure 7:
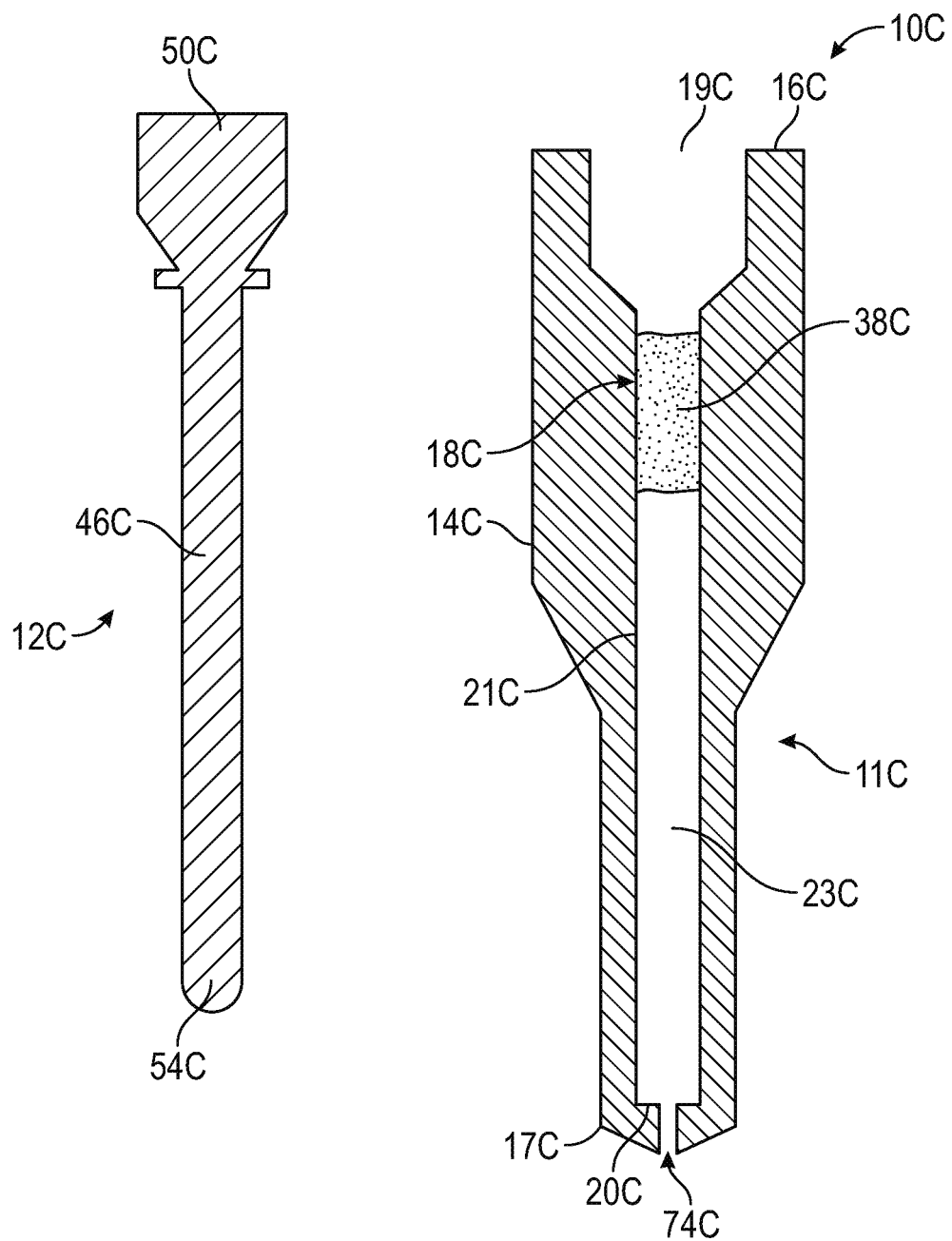
FIG. 7 is a cross-sectional view of an alternative non-limiting embodiment of the improved liquid test sample injection device constructed in accordance with the presently disclosed and/or claimed inventive concept(s).
Figure 8:
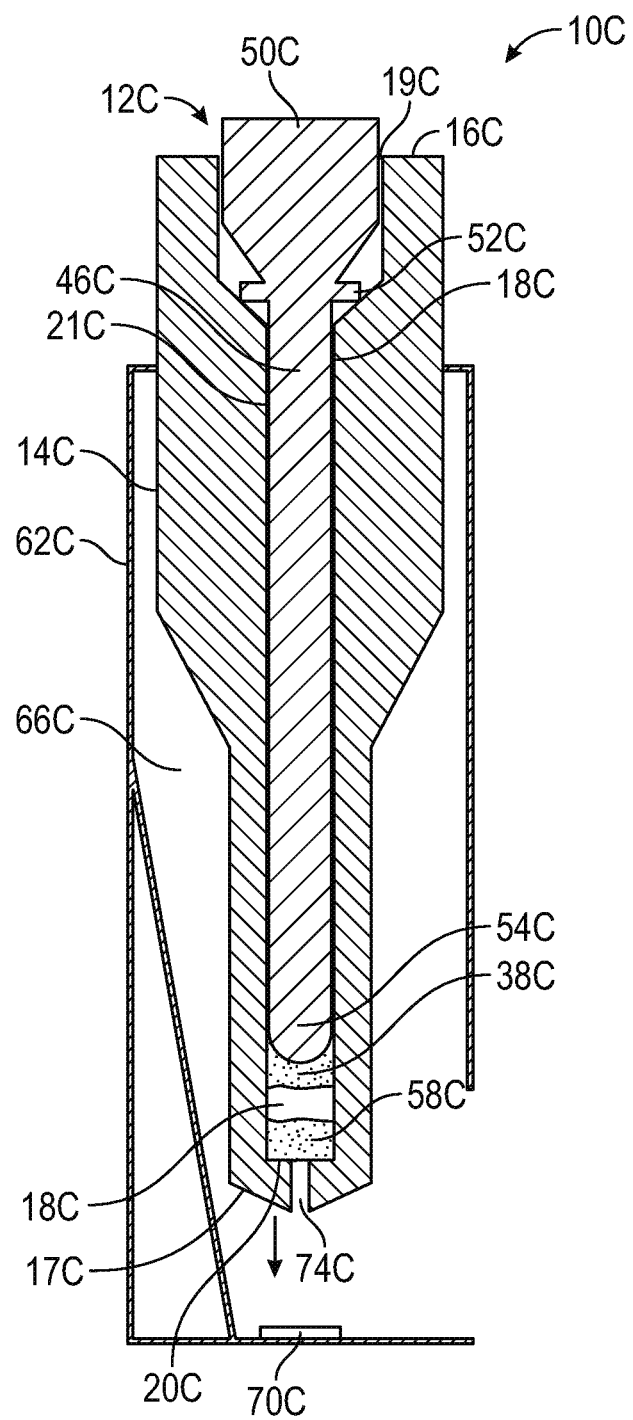
FIG. 8 is a cross-sectional view of the improved liquid test sample injection device of FIG. 7 in which the device is inserted into a reaction vessel.
Figure 9A:
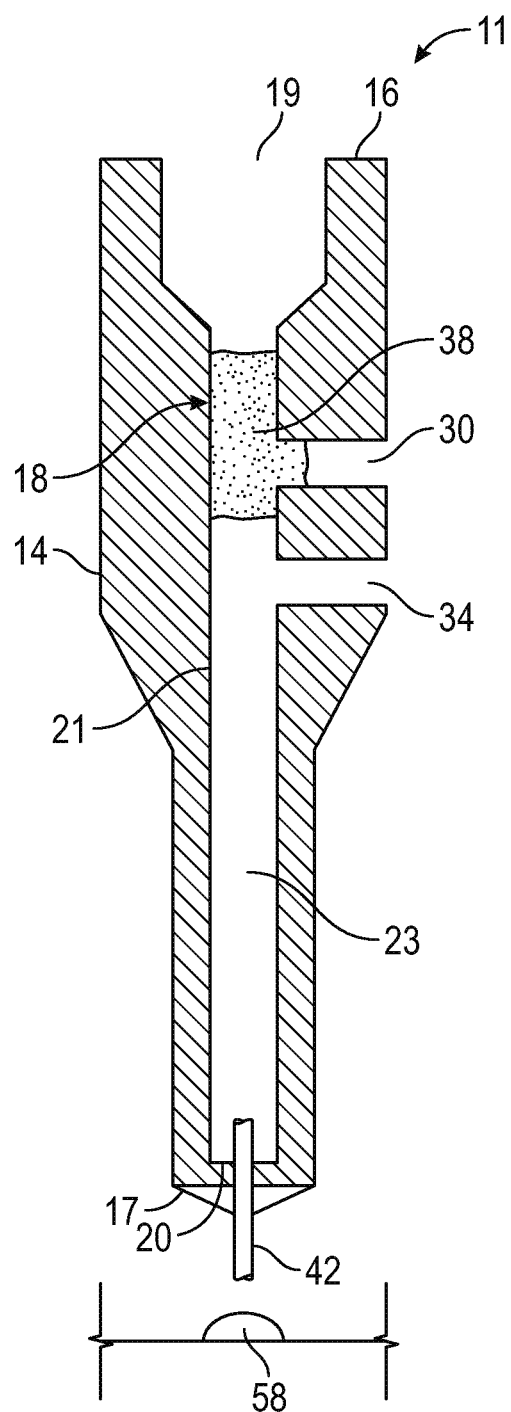
FIGS. 9A-9D are cross-sectional views of the improved liquid test sample injection device of FIG. 1 depicting the collection and injection of a liquid test sample into a reaction chamber of a reaction vessel for conducting at least one diagnostic assay.
Figure 9B:
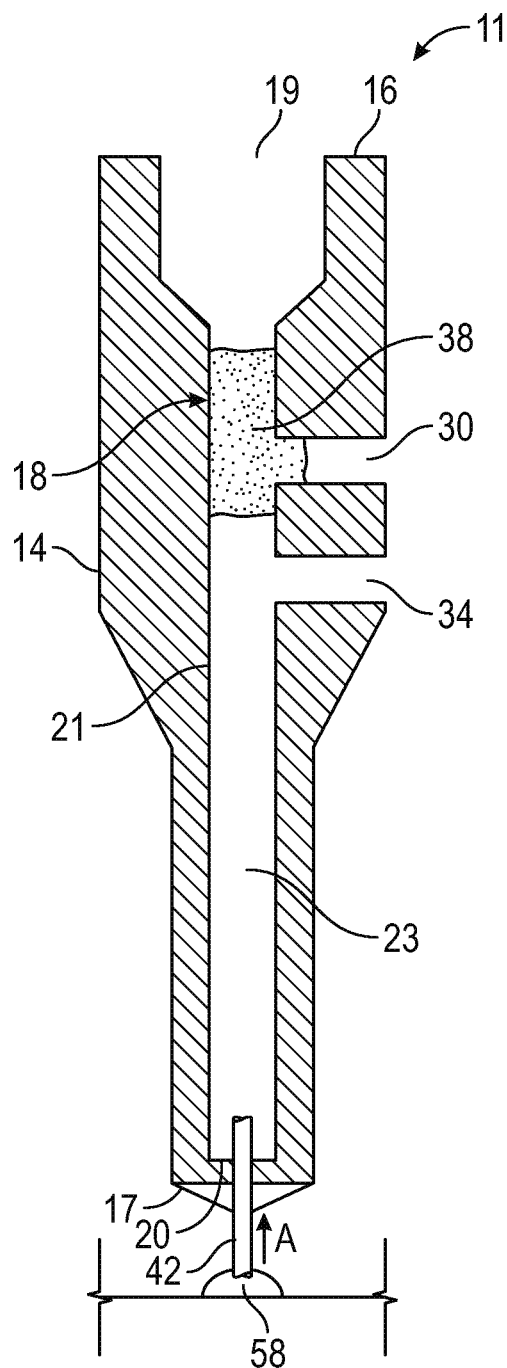
Figure 9C:
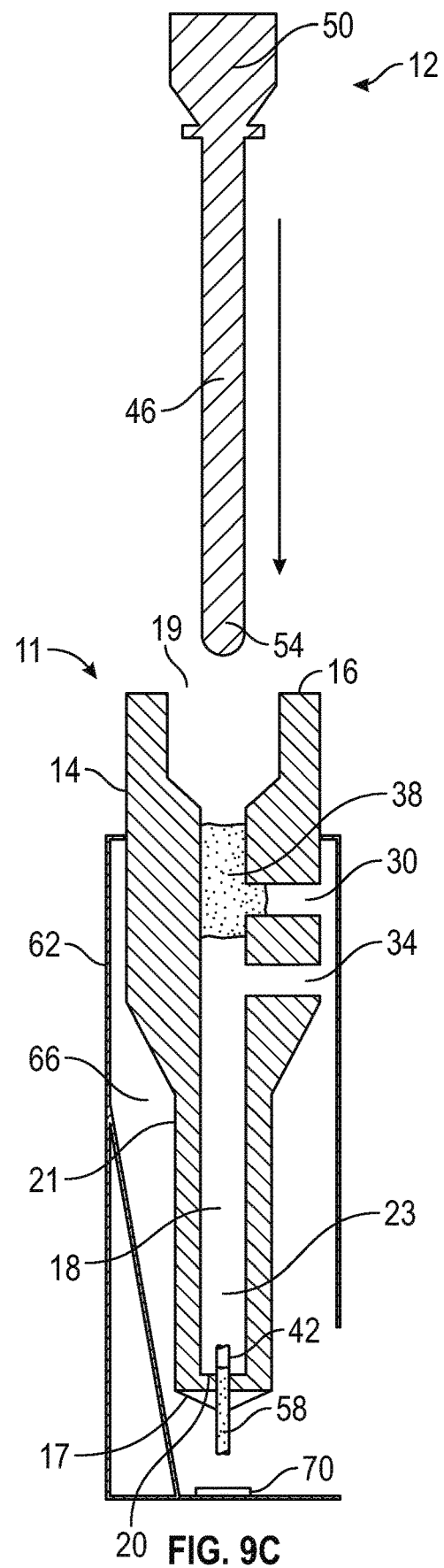
Figure 9D:
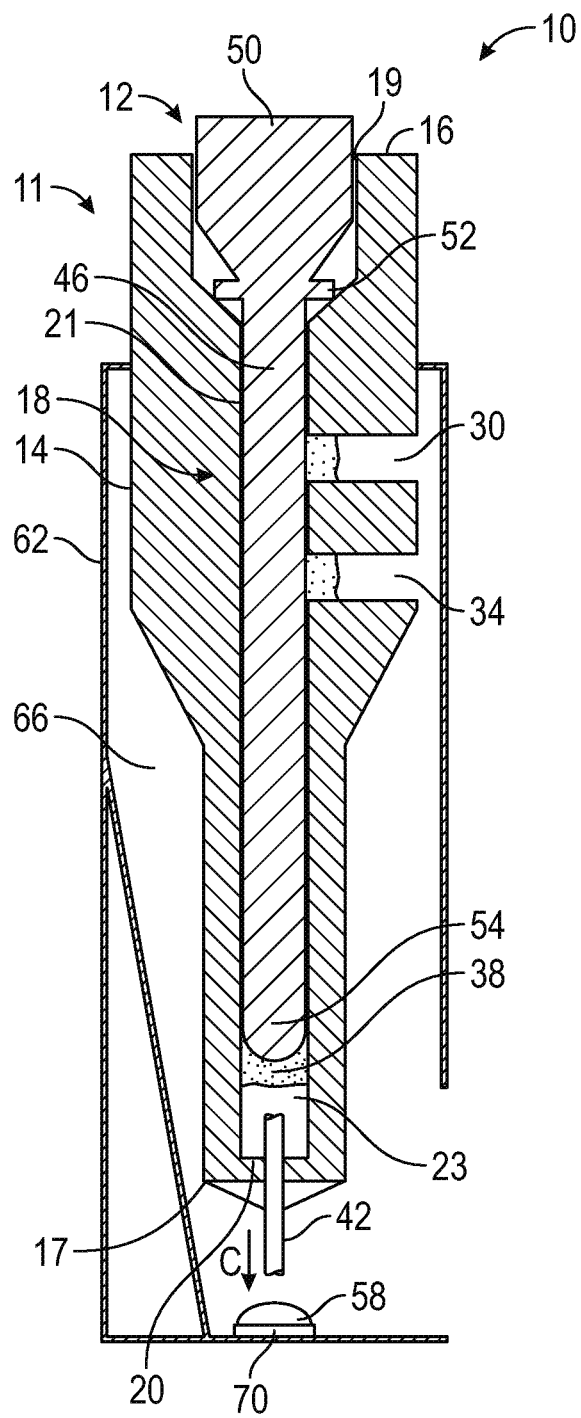

Referring now to FIGS. 7-8, shown therein is an alternative non-limiting embodiment of a liquid test sample injection device 10C that dispenses at least one liquid test sample into a reaction vessel. The liquid test sample injection device 10C and reaction vessel 62C are structurally similar to the liquid test sample injection device 10 depicted in FIG. 1 and the reaction vessel 62 depicted in FIG. 2. Accordingly, for purposes of brevity and as a result of these structural and functional similarities, only the differences in the structure (s) (and function(s)), if any, of the liquid test sample injection device 10C and/or reaction vessel 62C will be discussed herein. The description of the liquid test sample injection device 10 and reaction vessel 62 with respect to FIGS. 1-2 is applicable to the liquid test sample injection device 10C and reaction vessel 62C, other than for the structural and functional difference(s) described hereinbelow with respect to the liquid test sample injection device 10C and the reaction vessel 62C.

As shown in FIG. 7, the liquid test sample injection device 10C does not comprise at least one inlet 30 and at least one outlet 34, nor does the liquid test sample injection device comprise a capillary (such as capillary 42). Rather, the plug 38C is injected through an opening (not numbered) located at a first end 19C of a plunger receptacle 18C. Such injection of the plug 38C can be accomplished via any methodology commonly known in the art, including, but not limited to, either manually or via an automated process during the manufacturing process of the liquid test sample injection device 10C. In addition, the liquid test sample injection device 10C does not comprise a capillary (such as capillary 42); rather, the liquid fluid sample (shown more specifically in FIG. 8) is drawn into the plunger receptacle 18C of the injection body 11C via capillary action through opening 74C. The internal diameter of the plunger receptacle 18C (and/or opening 74C) is of such a dimension that the patient's liquid test sample does not leak or exit from the plunger receptacle 18C once collected.

Referring now to FIG. 8, upon insertion of the plunger 12C into the plunger receptacle 18C of the injection body 11C (which has already occurred in FIG. 8), the downward insertion of the plunger 12C deforms and/or compresses the plug 38C such that the plug 38C forms a substantially air-tight seal between the plunger body 46C and at least one side 21C of the receptacle wall of the plunger receptacle 18C. The downward motion of the sealed plunger 12C (through the plug 38C) creates a force that both: (1) causes any ambient air that may have collected or be present in plunger receptacle 18C to be expelled up through the plug 38C and out the opening (not numbered) located at the first end 19C of the plunger receptacle 18C; and (2) produces a pressure sufficient enough to actively and fully inject the liquid test sample 58C from the opening 74C into a reaction chamber 66C of the reaction vessel 62C onto at least one reagent pad 70C for the conductance of at least one diagnostic assay.

Referring now to FIGS. 9A-9D, shown therein is a non-limiting embodiment of the liquid test sample injection device 10 of FIG. 1 depicting the collection and injection of a liquid test sample 58 into a reaction chamber 66 of a reaction vessel 62 for conducting at least one diagnostic assay. While the liquid test sample injection device 10 (as shown in FIGS. 1-2) is depicted in FIGS. 9A-9D, it should be readily understood by a person having ordinary skill in the art that the methodology of collecting a patient's liquid test sample 58 and subsequently injecting the liquid test sample into a reaction chamber 66 of a reaction vessel 62 for conducting at least one diagnostic assay similarly applies to any and all liquid test sample injection device embodiments disclosed and/or claimed herein, including, without limitation, liquid test sample injection devices 10A (shown in FIGS. 3-4), 10B (shown in FIGS. 5-6), and 10C (shown in FIGS. 7-8).

Referring now to FIGS. 9A-9D, capillary 42 is brought into contact with a patient's liquid test sample 58. Upon contact with the patient's liquid test sample 58, the patient's liquid test sample 58 is drawn into (as represented by arrow A in FIG. 9B) capillary 42 where it is collected and remains in capillary 42. Once the patient's liquid test sample 58 is collected via capillary 42, the injection body 11 is secured within reaction vessel 62. Following securement of the injection body 11 within the reaction vessel 62, plunger 12 is inserted in a downward motion (as represented by arrow B in FIG. 9C) through the opening (not numbered) of the plunger receptacle 18 at the first end 19 of the plunger receptacle 18. The downward motion of the plunger 12 deforms and/or compresses the plug 38 such that the plug 38 forms a substantially air-tight seal between the plunger body 46 and the at least one side 21 of the receptacle wall of the plunger receptacle 18. The downward motion of the sealed plunger 12 results in the creation of a force that produces a pressure sufficient to: (1) force any ambient air that may be present in the plunger receptacle to be expelled up through the semi-permeable plug 38 and out the at least one outlet 34; and (2) actively inject (as represented by arrow C in FIG.

9D), as a distal end 54 of the sealed plunger 12 approaches the capillary 42, the patient's liquid test sample 58 into the reaction chamber 66 of the reaction vessel 62 and onto the at least one reaction pad 70 for conducting at least one diagnostic assay.

NON-LIMITING EXAMPLES OF THE INVENTIVE CONCEPT(S)

A liquid test sample injection device, comprising: a plunger, the plunger comprising a plunger body; an injection body, the injection body comprising at least one side, and a plunger receptacle configured to receive the plunger, the plunger receptacle comprising a receptacle wall having at least one side, a first end, a second end, and a bore longitudinally extending from the first end to the second end of the receptacle wall, the receptacle wall of the plunger receptacle further comprising at least one inlet and at least one outlet, the at least one inlet and the at least one outlet laterally extending between the at least one side of the injection body and the at least one side of the receptacle wall of the plunger receptacle; a capillary for collecting a patient's liquid test sample and injecting the patient's liquid test sample into a reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug forms a substantially air-tight seal between the plunger body and the at least one side of the receptacle wall of the plunger receptacle.

The liquid test sample injection device, wherein the patient's liquid test sample is selected from the group consisting of whole blood and urine.

The liquid test sample injection, wherein the plug comprises a petroleum jelly.

The liquid test sample injection device, wherein the diagnostic assay is selected from the group consisting of a glycated hemoglobin diagnostic assay and a creatinine diagnostic assay.

The liquid test sample injection device, wherein the injection body and capillary are constructed of high-density polyethylene.

A liquid test sample injection device, comprising: a plunger, the plunger comprising a plunger body; an injection body, the injection body comprising at least one side, and a plunger receptacle configured to receive the plunger, the plunger receptacle comprising a receptacle wall having at least one side, a first end, a second end, and a bore longitudinally extending from the first end to the second end of the receptacle wall, the receptacle wall of the plunger receptacle further comprising a single channel laterally extending between the at least one side of the injection body and the at least one side of the receptacle wall of the plunger receptacle; a capillary for collecting a patient's liquid test sample and injecting the patient's liquid test sample into a reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug forms a substantially air-tight seal between the plunger body and the at least one side of the receptacle wall of the plunger receptacle.

The liquid test sample injection device, wherein the patient's liquid test sample is selected from the group consisting of whole blood and urine.

The liquid test sample injection device, wherein the plug comprises a petroleum jelly.

The liquid test sample injection device, wherein the diagnostic assay is selected from the group consisting of a glycated hemoglobin diagnostic assay and a creatinine diagnostic assay.

The liquid test sample injection device, wherein the injection body and capillary are constructed of high-density polyethylene.

A liquid test sample injection device, comprising: a plunger, the plunger comprising a plunger body; an injection body, the injection body comprising a plunger receptacle configured to receive the plunger, the plunger receptacle comprising a receptacle wall having at least one side, a first end, a second end, and a bore longitudinally extending from the first end to the second end of the receptacle wall; a capillary for collecting a patient's liquid test sample and injecting the patient's liquid test sample into a reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug forms a substantially air-tight seal between the plunger body and the at least one side of the receptacle wall of the plunger receptacle.

The liquid test sample injection device, wherein the patient's liquid test sample is selected from the group consisting of whole blood and urine.

The liquid test sample injection device, wherein the plug comprises a petroleum jelly.

The liquid test sample injection, wherein the diagnostic assay is selected from the group consisting of a glycated hemoglobin diagnostic assay and a creatinine diagnostic assay.

The liquid test sample injection device, wherein the injection body and capillary are constructed of high-density polyethylene.

Thus, in accordance with the presently disclosed and claimed inventive concept(s), there have been provided devices, kits, and methods for at least one liquid test sample within a reaction vessel for use in analyte(s) detection/diagnostic assays. As described herein, the presently disclosed and claimed inventive concept(s) relate to embodiments of an improved liquid test sample injection device for use in the collection and injection of patients' liquid test samples into a reaction vessel for conducting diagnostic assays. Such presently disclosed and/or claimed inventive concept(s) fully satisfy the objectives and advantages set forth hereinabove. Although the presently disclosed and claimed inventive concept(s) has been described in conjunction with the specific drawings, experimentation, results and language set forth hereinabove, it is evident that many alternatives, modifications, and variations will be apparent to those skilled in the art. Accordingly, it is intended to embrace all such alternatives, modifications and variations that fall within the spirit and broad scope of the presently disclosed and claimed inventive concept(s).

What is claimed is:

1. A liquid test sample injection device for injecting a liquid test sample into a reaction vessel for use in an automated diagnostic assay system, the liquid test sample injection device comprising:

a plunger, the plunger comprising a plunger body;

an injection body, the injection body comprising at least one side and a plunger receptacle configured to receive the plunger, the plunger receptacle comprising a receptacle wall having at least one side, a first end, a second end, and a bore longitudinally extending from the first end to the second end of the receptacle wall, the receptacle wall of the plunger receptacle further comprising at least one inlet and at least one outlet, the at least one inlet and the at least one outlet laterally extending between the at least one side of the injection body and the at least one side of the receptacle wall of the plunger receptacle, and wherein the injection body is configured to be secured within the reaction vessel such that the at least one inlet and the at least one outlet are substantially flush with at least one internal wall of the reaction vessel;

a capillary for collecting a patient's liquid test sample via capillary action and injecting the patient's liquid test sample into the reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug remains in the bore and does not contact the capillary or the second end of the injection body, whereby the plug forms a substantially air-tight seal between the plunger body and the at least one side of the receptacle wall of the plunger receptacle.

2. The liquid test sample injection device of claim 1, wherein the patient's liquid test sample is selected from the group consisting of whole blood and urine.

3. The liquid test sample injection device of claim 1, wherein the plug comprises a petroleum jelly.

4. The liquid test sample injection device of claim 1, wherein the at least one diagnostic assay is selected from the group consisting of a glycated hemoglobin diagnostic assay and a creatinine diagnostic assay.

5. The liquid test sample injection device of claim 1, wherein the injection body and capillary are constructed of high-density polyethylene.

6. A liquid test sample injection device for injecting a liquid test sample into a reaction vessel for use in an automated diagnostic assay system, the liquid test sample injection device comprising:

a plunger, the plunger comprising a plunger body;

an injection body, the injection body comprising at least one side and a plunger receptacle configured to receive the plunger, the plunger receptacle comprising a receptacle wall having at least one side, a first end, a second end, and a bore longitudinally extending from the first end to the second end of the receptacle wall, the receptacle wall of the plunger receptacle further comprising a single channel laterally extending between the at least one side of the injection body and the at least one side of the receptacle wall of the plunger receptacle, and wherein the injection body is configured to be secured within the reaction vessel such that the single channel is substantially flush with at least one internal wall of the reaction vessel;

a capillary for collecting a patient's liquid test sample via capillary action and injecting the patient's liquid test sample into the reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug remains in the bore and does not contact the capillary or the second end of the injection body, whereby the plug forms a substantially air-tight seal between the plunger body and the at least one side of the receptacle wall of the plunger receptacle.

7. The liquid test sample injection device of claim 6, wherein the patient's liquid test sample is selected from the group consisting of whole blood and urine.

8. The liquid test sample injection device of claim 6, wherein the plug comprises a petroleum jelly.

9. The liquid test sample injection device of claim 6, wherein the at least one diagnostic assay is selected from the group consisting of a glycated hemoglobin diagnostic assay and a creatinine diagnostic assay.

10. The liquid test sample injection device of claim 6, wherein the injection body and capillary are constructed of high-density polyethylene.

11. A liquid test sample injection device for injecting a liquid test sample into a reaction vessel for use in an automated diagnostic assay system, the liquid test sample injection device comprising:

a plunger, the plunger comprising a plunger body;

an injection body, the injection body comprising a plunger receptacle configured to receive the plunger, the plunger receptacle comprising a receptacle wall having at least one side, a first end, a second end, and a bore longitudinally extending from the first end to the second end of the receptacle wall, and wherein the injection body is configured to be secured within the reaction vessel;

a capillary for collecting a patient's liquid test sample via capillary action and injecting the patient's liquid test sample into the reaction vessel for the conductance of at least one diagnostic assay, wherein a portion of the capillary is disposed through the second end of the receptacle wall of the plunger receptacle; and a plug, the plug being disposed within the bore such that when the plunger is inserted into the plunger receptacle, the plug remains in the bore and does not contact the capillary or the second end of the injection body, whereby the plug forms a substantially air-tight seal between the plunger body and the at least one side of the receptacle wall of the plunger receptacle.

12. The liquid test sample injection device of claim 11, wherein the patient's liquid test sample is selected from the group consisting of whole blood and urine.

13. The liquid test sample injection device of claim 11, wherein the plug comprises a petroleum jelly.

14. The liquid test sample injection device of claim 11, wherein the at least one diagnostic assay is selected from the group consisting of a glycated hemoglobin diagnostic assay and a creatinine diagnostic assay.

15. The liquid test sample injection device of claim 11, wherein the injection body and capillary are constructed of high-density polyethylene.

16. An assembly, comprising:

a reaction vessel for use in an automated diagnostic assay system, the reaction vessel comprising a reaction chamber with at least one reaction pad disposed therein;

the liquid test sample injection device of claim 11 secured within the reaction chamber of the reaction vessel; and wherein the liquid test sample injection device is configured to inject liquid test sample from the capillary thereof onto the at least one reaction pad of the reaction vessel for conductance of at least one diagnostic assay.

17. The assembly of claim 16, wherein the patient's liquid test sample is selected from the group consisting of whole blood and urine.

18. The assembly of claim 16, wherein the plug of the liquid test sample injection device comprises a petroleum jelly.

19. The assembly of claim 16, wherein the at least one diagnostic assay is selected from the group consisting of a glycated hemoglobin diagnostic assay and a creatinine diagnostic assay.

20. The assembly of claim 16, wherein the injection body and capillary of the liquid test sample injection device are constructed of high-density polyethylene.

* * * * *